United States Patent [19]

Belter

[11] Patent Number: 5,540,452

[45] Date of Patent: Jul. 30, 1996

[54] GASKET INSERT ASSEMBLY

[75] Inventor: Jerome G. Belter, Mt. Prospect, Ill.

[73] Assignee: Dana Corporation, Toledo, Ohio

[21] Appl. No.: 306,235

[22] Filed: Sep. 14, 1994

[51] Int. Cl.⁶ .................................................... F16J 15/06
[52] U.S. Cl. ...................... 277/235 B; 277/227
[58] Field of Search ................. 277/235 B, 227, 277/231, 233, 189

[56] References Cited

U.S. PATENT DOCUMENTS

| | | | |
|---|---|---|---|
| 2,001,225 | 5/1935 | Victor | 277/235 B |
| 3,108,818 | 10/1963 | Furstenburg | 277/189 |
| 4,126,318 | 11/1978 | Belter | 277/235 B |
| 4,405,138 | 9/1983 | Skrycki | 277/235 |
| 4,535,999 | 8/1985 | Locacius | 277/235 |
| 4,676,514 | 6/1987 | Beutter et al. | 277/235 B |
| 4,783,087 | 11/1988 | DeCore et al. | 227/166 |
| 5,145,190 | 9/1992 | Boardman | 277/166 |
| 5,215,315 | 6/1993 | Belter | 277/235 |

FOREIGN PATENT DOCUMENTS

| | | | |
|---|---|---|---|
| 0286859 | 11/1990 | Japan | 277/235 B |
| 2092244 | 1/1982 | United Kingdom . | |

*Primary Examiner*—Daniel G. DePumpo
*Attorney, Agent, or Firm*—Dykema Gossett PLLC

[57] ABSTRACT

An improved gasket insert assembly for use in a gasket that is adapted to seal a high pressure fluid opening includes a gasket body, a sealing member with the high pressure fluid opening, and a unitized flange assembly. The sealing member is secured to the flange assembly and positioned in an aperture of the gasket body. The flange assembly is secured to the gasket body at locations generally remote from the aperture of the gasket body, using flanges that typically serve additional functions, increasing the clamping force available for sealing.

20 Claims, 2 Drawing Sheets

5,540,452

GASKET INSERT ASSEMBLY

FIELD OF THE INVENTION

The present invention relates to improvements in gasket insert assemblies and more particularly to an insert assembly for use with a high pressure fluid transfer passage.

BACKGROUND OF THE INVENTION

Gaskets are often used to seal mating mechanical components. One common application involves gasket placement between the engine block and cylinder head of an internal combustion engine. Cylinder head gaskets typically extend around cylinder bores to provide combustion seals, maintaining the high temperature gases of combustion within the cylinder bores. Simultaneously, the gaskets also seal fluid flow openings such as coolant and oil openings to prevent undesirable fluid mixing.

Fluids passing through the openings of a cylinder head gasket may be at high pressures and elevated temperatures. Therefore, gasket modifications are generally required to adequately seal the fluid openings. It is known to form an aperture in a main gasket body of the gasket to receive a separate sealing member.

Often the sealing member is secured to the main gasket body using an adhesive applied between the sealing member and the main gasket body, thereby permitting limited handling of the gasket to position it between the mating components. There are a number of disadvantages to using an adhesive. In particular, the gasket body and sealing member have limited cross-sectional areas. Thus, there is a relatively limited area of contact available for the adhesive. Additionally, the very nature of the gasket body, often formed from graphite having a low coefficient of friction, disfavors bonding between an adhesive and the gasket body. Yet, if an adhesive is adequately bonded to the gasket body, even limited handling often results in the flaking away of the portion of the gasket body in contact with the adhesive.

In view of such disadvantages, it is known to secure a fluid sealing member received within an aperture of a gasket body using a separate mechanical fastener. Such a fastener is secured to the sealing member and to the main gasket body adjacent the aperture to be sealed. However, through the use of a separate mechanical fastener, a portion of the clamping force from the bolted connection of the mechanical components is required to secure the fastener to the gasket body. Thus, this portion of the clamping force is not available to adequately compress the sealing member and prevent fluid leakage. The problem is further complicated when the aperture and received sealing member are positioned away from a bolted connection since the mechanical fastener reduces the already limited available clamping force.

SUMMARY OF THE INVENTION

An improved gasket insert assembly for use in a gasket is adapted to seal a high pressure fluid opening includes a gasket body, a sealing member, and a unitized flange assembly.

The gasket body has an upper and a lower surface, an outer periphery, and an inner periphery defining an aperture that extends through a portion of the gasket body. Typically, the gasket body is a composition perforated steel core having a graphite type facing of conventional typical densities. Formed within the gasket body is a plurality of openings. When used as a cylinder head gasket, the gasket body includes openings that form a portion of combustion bore openings and bolt holes.

A sealing member with the high pressure fluid opening is received in the aperture of the gasket body. The sealing member includes a central metal core defining an outer periphery of the sealing member, an upper seal bead, and a lower seal bead, the seal beads formed from an elastomeric material. The beads have a main body and selectively include a support surface formed between the outer periphery of the sealing member and the main body of the beads.

The unitized flange assembly is used to secure the sealing member within the aperture of the gasket body. The flange assembly has an inner periphery defining an opening generally adjacent the aperture. A plurality of tabs are disposed about and originate from the inner periphery of the flange assembly beneath the lower surface of the gasket body and contact the support surface of the sealing member's upper bead. Preferably, the number of tabs are limited to avoid unduly reducing the amount of clamping force available to compress the sealing member and provide a leak proof seal. A plurality of lower extensions are disposed about and originate from the inner periphery of the flange assembly beneath the lower surface of the gasket body and contact the support surface of the sealing member's lower bead. Preferably, the lower support extensions are adjacent each side of one of the tabs.

In a preferred embodiment, the flange assembly is secured to the gasket body at a location remote from the aperture using lacing to integrate the various components of the assembly. The flange assembly may be secured to the outer periphery of the gasket body. Alternatively, the flange assembly may include a flange that is secured to an inner periphery of at least one opening of the gasket body. Preferred openings include a bolt hole, a combustion bore opening or other fluid passages. Thus, the flanges perform an additional function such as protecting the gasket body, eliminating the need for a separate fastener secured to the sealing member and to the main gasket body which serves no other function. The lacing enhances the sealing load distribution and limits the bending that may happen to the mating components. The flange assembly may comprise a stainless steel, tin plate or other metals.

A method of making a gasket comprises the steps of introducing a unitized flange assembly, inserting a sealing member into the aperture, deforming the tabs of the flange assembly so that a portion of the tabs securingly engage the upper support surface of the sealing member, mating the flange assembly with the gasket body, and deforming a flange of the flange assembly about the upper surface of the gasket body to secure the flange assembly to the gasket body.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF A PREFERRED EMBODIMENT

Figure 1:
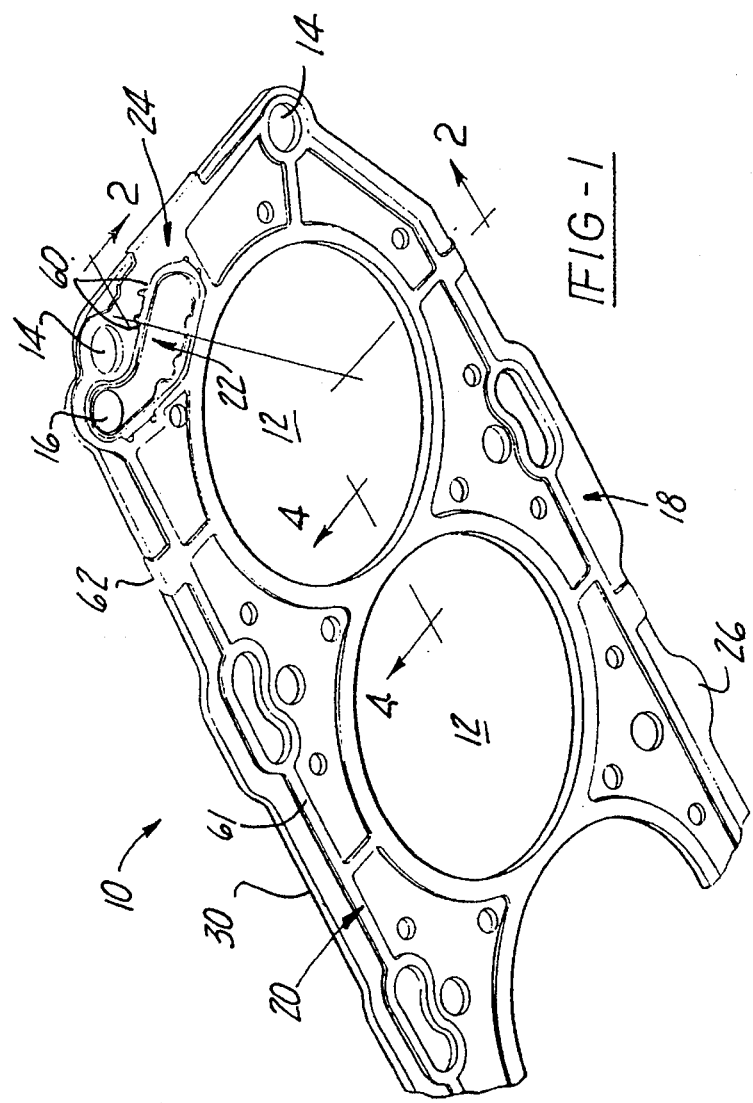
FIG. 1 is a perspective view of an underside of a gasket according to a preferred embodiment of the present invention.

A gasket 10 illustrated in FIGS. 1 through 4 is used to seal mating mechanical components (not shown). In a preferred embodiment, gasket 10 functions as a cylinder head gasket, compressed between an engine block and cylinder head of an internal combustion engine (none of the latter are shown). Gasket 10 includes a plurality of combustion bore openings 12, bolt holes 14, and at least one high pressure fluid flow opening 16. A gasket body 18, a unitized flange assembly 20, and a sealing member 22 work in combination to form an insert assembly 24 that is used to seal high pressure fluid flow opening 16 formed in sealing member 22.

Figure 3:
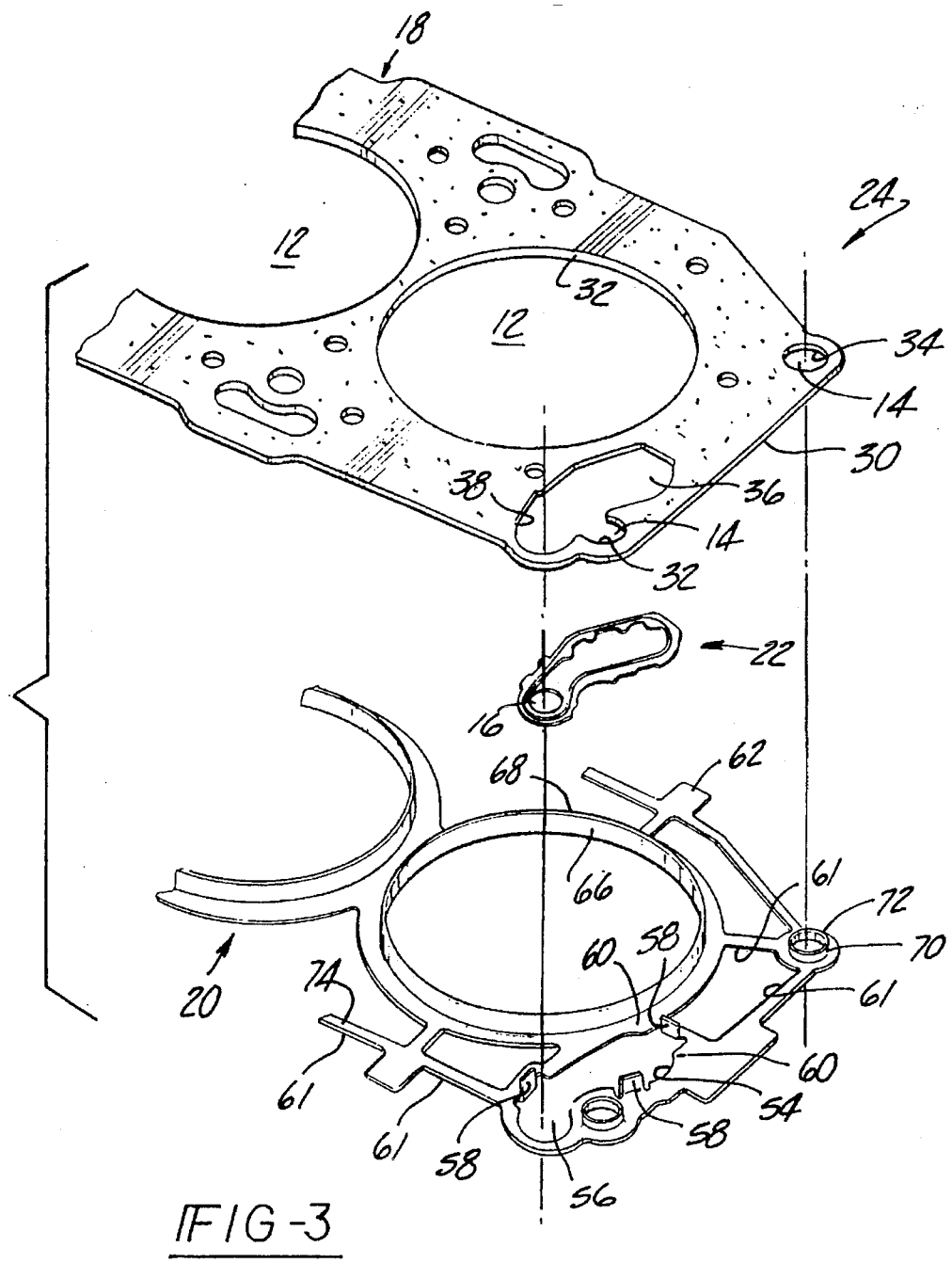
FIG. 3 is an exploded perspective view of the gasket showing the sealing member, gasket body, and unitized flange assembly.

Gasket body 18 includes a lower surface 26, an upper surface 28, and an outer periphery 30. Typically, gasket body 18 is a composition perforated steel core or stainless steel core having a graphite type facing of typical densities. Formed within gasket body 18 is a plurality of openings defined by respective inner peripheries, including those that form a portion of combustion bore openings 12 and bolt holes 14. As illustrated in FIG. 3, a combustion bore opening 12 has an inner periphery 32 while a bolt hole 14 has an inner periphery 34.

Figure 2:
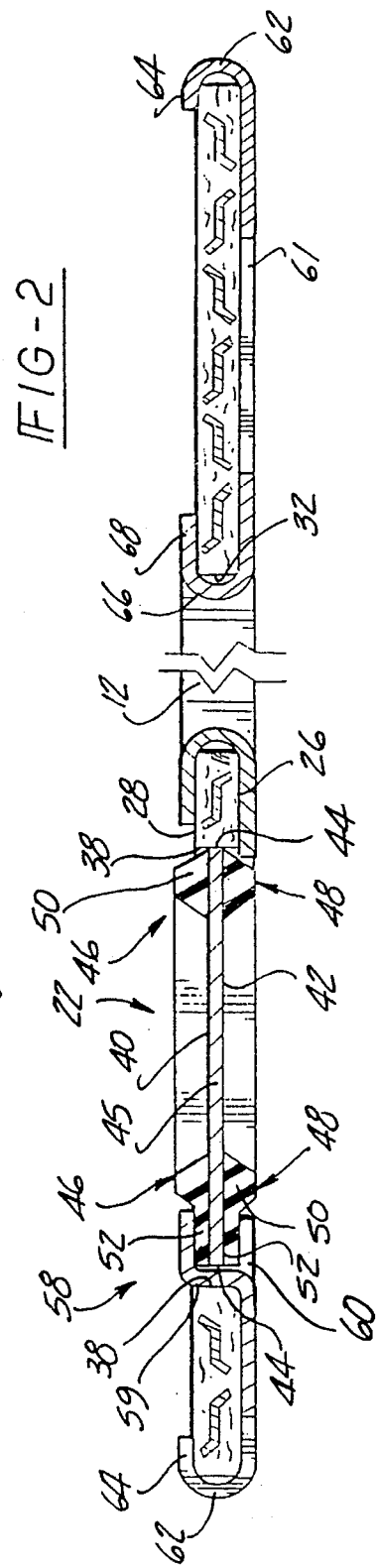
FIG. 2 is a cross-sectional view of a portion of the gasket along line 2—2 of FIG. 1.

Gasket body 18 also includes an aperture 36 defined by an inner periphery 38 that is adapted to receive sealing member 22. As illustrated in FIG. 2, Sealing member 22 has an upper surface 40, a lower surface 42, and an outer periphery 44 that is generally adjacent inner periphery 38 of aperture 36. Sealing member 22 includes a central metal core 45 that defines outer periphery 44, an upper seal bead 46 bonded to upper surface 40, and a lower seal bead 48 bonded to lower surface 42. Seal beads 46 and 48 circumscribe a generally outer extent of sealing member 22. Beads 46 and 48 each have a main body 50 that is typically trapezoidal in shape, the base of each body 50 bonded the respective surface of core 45. Before being compressed by the clamping force of the mating components, a portion of body 50 typically extends axially beyond the respective upper surface 28 or lower surface 26 of gasket body 18. Thus, when gasket 10 is compressed between the mating mechanical components, beads 46 and 48 provide an improved seal for high pressure fluid flow opening 16. So that they may readily compress, beads 46 and 48 are formed from an elastomeric material. Preferred forms of elastomeric material include silicone, fluorosilicone, viton, and nitrile.

As illustrated in FIG. 2, beads 46 and 48 may selectively include a support surface 52 adjacent main body 50 adapted to mate with a portion of unitized flange assembly 20. Flange assembly 20 is used to secure sealing member 22 within aperture 38 of gasket body 18. Flange assembly 20 has an inner periphery 54 defining an opening 56 that is generally adjacent aperture 38 of gasket body 18, as best illustrated in FIG. 3. A plurality of tabs 58 originate from periphery 54 beneath lower surface 26 of gasket body 18 and contact support surface 52 of bead 46. Tabs 58 include a generally S-shaped portion 59 that is formed when tabs 58 are deformed into position, as discussed further below.

As shown in FIG. 1, unitized flange assembly 20 also includes a plurality of lower support extensions 60 that are disposed about and originate from periphery 54 of opening 56 beneath lower surface 26 of gasket body 18. Lower support extensions 60 are adapted to contact support surface 52 of bead 48 on the lower surface 40 of sealing member 22.

In practice, it is generally preferable to minimize the number of tabs 58 and lower support extensions 60 required to retain sealing member 20 in position within aperture 36 of gasket body 18. Only limited handling is required to position gasket 10 between the mating components. Once gasket 10 is compressed by the bolted connection of the mating mechanical components, tabs 58 and lower support extensions 60 are no longer required. Further, the presence of unnecessary tabs 58 and lower support extensions 60 may unduly reduce the amount of clamping force available to compress sealing member 22 and provide a leak proof seal. Therefore, in a preferred embodiment of the present invention, only three tabs 58 are illustrated spaced about periphery 54 of flange assembly 20 with lower support extensions 60 adjacent each side of a tab 58.

Unitized flange assembly 20 is secured to gasket body 18 at locations remote from aperture 36. In the illustrated embodiment, flange assembly 20 includes a plurality of flanges 62 that are integrally connected to tabs 58 and lower support extensions 60 using a lacing 61. Flanges 62 engage outer periphery 30 of gasket body 18 such that a portion 64 contacts upper surface 28 of gasket body 18.

Figure 4:
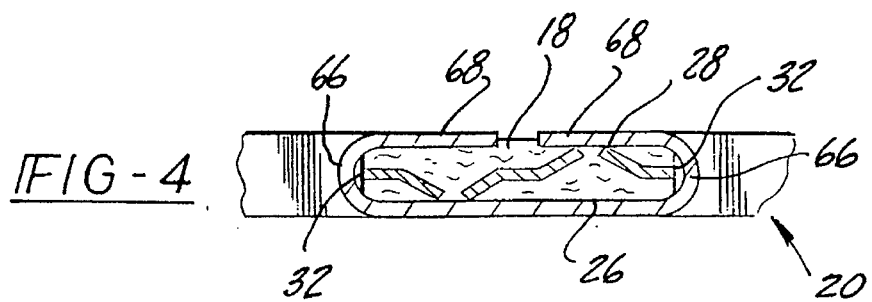
FIG. 4 is a cross-sectional view of a portion of the gasket along line 4—4 of FIG. 1.

Flange assembly 20 also includes flanges that circumscribe and are secured to an inner periphery of a number of openings in gasket body 18. As best illustrated in FIG. 4, flange assembly 20 includes flanges 66 that are adopted to engage periphery 32 of each combustion bore hole 12. Flanges 66 are integrally connected to tabs 58 and lower support extensions 60 using lacing 61. Flanges 66 are deformed so that a portion 68 contacts upper surface 26 of gasket body 18. Besides securing flange assembly 20 to gasket body 18, flanges 66 perform the additional function of acting as fire rings to protect inner periphery 32 of combustion bore holes 12 from detrimental effects of the highly corrosive and elevated temperature gases of combustion.

Similarly, flange assembly 20 includes a number of flanges 70 that are adjacent the inner periphery 34 of bolt holes 14. Flanges 70 are integrally connected to tabs 58 and lower support extensions 60 using lacing 61. Flanges 70 are deformed so that a portion 72 contacts upper surface 26 of gasket body 18. As with flanges 66, flanges 70 serve an additional function. Flanges 70 protect gasket body 18 from the extremely high clamping loads immediately adjacent each bolt hole.

In the illustrated embodiment, as shown in FIG. 1, bolt hole 14 of gasket 10 is discrete from, but closely positioned near sealing member 38. A close locational relationship between a bolt hole 14 and sealing member 22 is often desirable to provide maximum clamping force to the sealing member. However, such a close proximity is not required to secure flange assembly 20 to gasket body 18 in a manner whereby sealing member 22 is correctly positioned with respect to the gasket body in the assembled gasket.

As noted above, the bolted connection of the mating members is used to compress and clamp gasket 10 into position. However, a portion of the clamping force must be used to compress a fastener between a sealing member and a gasket body. Therefore, to maximize the amount of clamping force available for sealing, it is advantageous to avoid the need for a separate fastener secured to a sealing member and to the main gasket body immediately adjacent the aperture to be sealed which serves no other function. There are also cost and manufacturing advantages in eliminating a separate fastener. Gasket 10 uses flanges 66 and 70, which are already required, to provide an alternative way to secure sealing member 22 to gasket body 18 by way of the unitized flange 20, merely for the cost of the material to interconnect the various aspects of flange assembly 20. In the case of flanges 62, their location at the outer periphery 30 of gasket body 18 is outside the compressed area of gasket 10, limiting any detrimental decrease in the amount of clamping force available.

The material used to interconnect the various aspects of flange assembly 20, primarily in the form of lacing 61, serves several additional important functions. In particular, lacing 61 enhances the sealing load distribution and limits the bending that may happen to the mating components. For example, when gasket 10 acts as a cylinder head gasket, lacing 61 limits head bending that occurs when using an aluminum cylinder head.

Unitized flange assembly 20 is produced in typical progressive dies. As illustrated in FIG. 3, tabs 58, 66, and 70 extend generally perpendicular to lacing 61 while flange 62 is parallel to lacing 61.

Sealing member 22 is selectively inserted into opening 56 of flange assembly 20 such that a support surface 52 of bead 48 contacts lower support extensions 60. Then tabs 58 are deformed so that portion 59 securingly engages upper support surface 52 of bead 46, trapping sealing member 22 between tabs 58 and lower support extensions 60.

Either before or after sealing member 22 is secured to flange assembly 20, assembly 20 is mated with gasket body 18 so that an upper surface 74 of flange assembly 20 is brought into facing relation with lower surface 26 of the gasket body. Then flanges 62, 66, and 72 are deformed to secure flange assembly 20 to gasket body 18 and crimped so that portions 64, 68, and 74 of the respective flanges are in facing relation to upper surface 28 of the gasket body. Flanges 66 and 72 are crimped about the inner periphery 32, 34 of their respective holes 12 and 14, and flange 64 is crimped about outer periphery 30 of gasket body 18. Standard closing and flattening type tooling may be used to deform tabs 58 and flanges 62, 66, and 72.

Preferred embodiments of the present invention have been described. It is to be understood that variations and modifications may be employed without departing from the scope of the present invention. Accordingly, the following claims should be studied to learn the true scope of the present invention.

What is claimed is:

1. A gasket insert assembly adapted to seal a high pressure fluid opening comprising:
    a gasket body with an upper surface and a lower surface, and an inner periphery defining an aperture that extends through a portion of said gasket body;
    a sealing member received in said aperture of said gasket body, said sealing member having an outer periphery and further including an upper surface and a lower surface;
    a unitized flange assembly used to secure said sealing member within said aperture of said gasket body, said flange assembly having an inner periphery defining an opening generally adjacent said aperture, a plurality of tabs that are disposed about and originate from said inner periphery of said flange assembly beneath said lower surface of said gasket body and contact a portion of said upper surface of said sealing member, a plurality of lower support extensions that are disposed about and originate from said inner periphery of said flange assembly beneath said lower surface of said gasket body and which extensions contact a portion of said lower surface of said sealing member.

2. A gasket insert assembly as recited in claim 1, wherein said flange assembly is secured to said gasket body at a location remote from said aperture.

3. A gasket insert assembly as recited in claim 1, wherein said lower support extensions are adjacent each side of one of said tabs.

4. A gasket insert assembly as recited in claim 1, wherein there are no more than three of said tabs spaced about said inner periphery of said flange assembly.

5. A gasket insert assembly as recited in claim 1, wherein said tabs include a generally S-Shaped center portion, said center portion disposed between said sealing member and said gasket body.

6. A gasket insert assembly as recited in claim 1, wherein said sealing member includes a central metal core defining said outer periphery of said sealing member, an upper seal bead and a lower seal bead secured to said core, said beads circumscribing a generally outer extent of said sealing member.

7. A gasket insert assembly as recited in claim 6, wherein said beads are formed from an elastomeric material.

8. A gasket insert assembly as recited in claim 6, wherein said beads have a main body and selectively include a support surface formed between said outer periphery of said sealing member and said main body, said support surfaces adapted to receive one of said tabs and said lower support extensions.

9. A gasket adapted to be positioned and compressed between a head and a block of an internal combustion engine to act as a seal between the mating mechanical components, the gasket comprising:
    a gasket body with an upper surface and a lower surface, and an inner periphery defining an aperture that extends through a portion of said gasket body and corresponding to a location of a high pressure fluid flow orifice;
    a sealing member received in said aperture of said gasket body, said sealing member having an outer periphery and further including an upper surface and a lower surface;
    a unitized flange assembly used to secure said sealing member within said aperture of said gasket body, wherein said flange assembly is secured to said gasket body at a location remote from said aperture, said flange assembly having an inner periphery defining an opening generally adjacent said aperture, a plurality of tabs that are disposed about and originate from said periphery beneath said lower surface of said gasket body and contact a portion of said upper surface of said sealing member, and a plurality of lower support extensions that are disposed about and originate from said periphery beneath said lower surface of said gasket body and which extensions contact a portion of said lower surface of said sealing member.

10. A gasket as recited in claim 9, wherein said flange assembly is secured to an outer periphery of said gasket body.

11. A gasket as recited in claim 9, wherein said flange assembly includes a portion that circumscribes and is secured to an inner periphery of at least one opening of said gasket body.

12. A gasket as recited in claim 11, wherein said at least one opening is a bolt hole.

13. A gasket as recited in claim 12, wherein said bolt hole is positioned adjacent said aperture to provide increased clamping compression to said sealing member.

14. A gasket as recited in claim 11, wherein said at least one opening is a combustion bore opening.

15. A gasket as recited in claim 9, wherein said flange assembly comprises a stainless steel.

16. A gasket as recited in claim 9, wherein said flange assembly includes lacing to provide support to said flange assembly.

17. A method of making a gasket adapted to be positioned and compressed between a head and a block of an internal combustion engine to act as a seal between the mating mechanical components, comprising the steps of:

introducing a unitized flange assembly with an upper surface, said flange assembly having an inner periphery defining an opening, a plurality of tabs extending generally perpendicular away from said upper surface of said inner periphery;

inserting a sealing member into said opening of said flange assembly, said sealing member having an outer periphery, an upper support surface and a lower support surface, said lower support surface of said sealing member contacting a plurality of lower support extensions that are disposed about and originate from said inner periphery of said flange assembly;

deforming said tabs so that a portion of said tabs securingly engage said upper support surface of said sealing member, trapping said sealing member between said portion of said tabs and said lower support extensions;

mating said flange assembly with a gasket body, said gasket body having an upper surface and a lower surface, said lower surface of said gasket body in facing relation with said upper surface of said flange assembly; and deforming a flange of said flange assembly about said upper surface of said gasket body to secure said flange assembly to said gasket body.

18. A method as recited in claim 17, further comprising the step of spacing said flange away from said opening of said flange assembly.

19. A method as recited in claim 18, wherein said deforming step comprises the sub-step of crimping said flange about an outer periphery of said gasket body, a portion of said flange in facing relation to said upper surface of said gasket body.

20. A method as recited in claim 18, wherein said deforming step comprises the sub-steps of:

inserting said flange through a corresponding hole of said gasket body adjacent an inner periphery of said hole, said flange extending generally perpendicular away from said upper surface of said flange assembly; and crimping said flange about said inner periphery of said hole, positioning a portion of said flange in facing relation to said upper surface of said gasket body adjacent said inner periphery of said hole of said gasket body.

* * * * *